(12) United States Patent
Christy et al.

(10) Patent No.: US 8,133,401 B2
(45) Date of Patent: Mar. 13, 2012

(54) METHOD AND APPARATUS FOR TREATING LIME SLURRY FOR GRIT REMOVAL

(75) Inventors: Paul G. Christy, Malvern, PA (US); Michael Quici, Ambler, PA (US)

(73) Assignee: RDP Company, Norristown, PA (US)

( * ) Notice: Subject to any disclaimer, the term of this patent is extended or adjusted under 35 U.S.C. 154(b) by 988 days.

(21) Appl. No.: 11/106,068

(22) Filed: Apr. 14, 2005

(65) Prior Publication Data
US 2006/0231507 A1    Oct. 19, 2006

(51) Int. Cl.
*B01D 21/02* (2006.01)
(52) U.S. Cl. .................. 210/800; 210/805; 423/640
(58) Field of Classification Search .................. None
See application file for complete search history.

(56) References Cited

U.S. PATENT DOCUMENTS

| | | | |
|---|---|---|---|
| 2,904,401 A | 9/1959 | Booth | |
| 3,170,770 A * | 2/1965 | Thompson et al. | 422/162 |
| 3,942,379 A | 3/1976 | Kanzler | |
| 4,081,998 A | 4/1978 | Martig, Jr. | |
| 4,261,953 A * | 4/1981 | Gisler | 422/162 |
| 4,281,540 A | 8/1981 | Lee et al. | |
| 4,416,764 A | 11/1983 | Gikis et al. | |
| 4,436,703 A * | 3/1984 | Lane | 422/225 |
| 4,482,528 A * | 11/1984 | Emmett | 423/243.05 |
| 4,547,349 A * | 10/1985 | Lane | 423/164 |
| 4,588,559 A | 5/1986 | Emmett | |
| 4,636,379 A | 1/1987 | Bestek et al. | |
| 4,906,130 A | 3/1990 | Manley, Jr. et al. | |
| 5,223,239 A | 6/1993 | Moran et al. | |
| 5,294,408 A * | 3/1994 | Muzik et al. | 422/162 |
| 5,336,481 A | 8/1994 | Muzik et al. | |
| 5,368,731 A * | 11/1994 | Pesotini | 210/295 |
| 5,413,635 A * | 5/1995 | Matweecha et al. | 106/792 |
| 5,492,685 A | 2/1996 | Moran et al. | |
| 5,520,779 A | 5/1996 | Bold | |
| 5,536,420 A | 7/1996 | Oyzboyd | |
| 5,554,279 A | 9/1996 | Christy | |
| 5,616,420 A | 4/1997 | Yamaoka et al. | |
| 5,746,983 A | 5/1998 | Stephansen | |
| 5,792,440 A | 8/1998 | Huege | |
| 5,876,689 A * | 3/1999 | Webeling et al. | 423/640 |
| 5,965,103 A | 10/1999 | Golley et al. | |
| 6,036,029 A | 3/2000 | Gommel et al. | |
| 6,451,281 B1 | 9/2002 | Ebeling et al. | |
| 6,568,842 B1 * | 5/2003 | Murray | 366/137 |
| 6,689,279 B1 | 2/2004 | Train | |
| 7,416,673 B2 | 8/2008 | Christy et al. | |
| 2006/0231507 A1 * | 10/2006 | Christy et al. | 210/767 |
| 2006/0231511 A1 * | 10/2006 | Christy et al. | 210/800 |
| 2008/0131358 A1 * | 6/2008 | Woida et al. | 423/637 |

OTHER PUBLICATIONS

Factors Affecting Lime Slakig; Stanco Products Ltd.; 4 pages; downloade from Internet on Aug. 16, 2008.*
Mohamad Hassibi; Factors Affecting Quick Lime Consumption in Dry FGD; 11 pages; Apr. 2007; downloaded from Internet on Aug. 16, 2008.*
J.H. Potgieter; An Empirical Study of Factors Influencing Lime Slaking Part II; Lime Constituents and Water Composition; Water SA vol. 29 No. 2 Apr. 2003; pp. 157-160.*

(Continued)

*Primary Examiner* — Robert James Popovics
(74) *Attorney, Agent, or Firm* — Paul & Paul

(57) ABSTRACT

A method and apparatus is provided for conveying lime slurry, removing and controlling the amount of grit, and feeding lime slurry, wherein the lime slurry moves through a recirculation loop, and wherein gravity removal of grit from the lime slurry takes place.

15 Claims, 3 Drawing Sheets

OTHER PUBLICATIONS

Mohamad Hassibi; An Overview of Lime Slaking and Factors That Affect the Process; Chemco Equipment; Nov. 1999; 20 pages.*

The Ultimate Lime Slaking System; CHEMCO Equipment Brochure; 2 pages; 1996.*

Travis Smith et al.; Lime Slaker Selection; Stanco Projects Ltd.; Jan. 7, 1998; 5 pages; dowloaded from Internet on Aug. 16, 2008.*

Perry, R.H.; Green, D.W. (1997). Perry's Chemical Engineers' Handbook (7th Edition). (pp. 15-4 throught 15-6). McGraw-Hill.*

Memorandum Dated Jan. 8, 2010; *Nordetek Environmental, Inc.* et al. v. *RDP Technologies, Inc.*; US District Court for the Eastern District of Pennsylvania; 52 pages.*

\* cited by examiner

METHOD AND APPARATUS FOR TREATING LIME SLURRY FOR GRIT REMOVAL

BACKGROUND OF THE INVENTION

Lime has been found to have many uses. Such uses have included the treatment of sewage sludge to remove pathogens, lime stabilization of waste water, pasteurization of sludge and many other treatment processes.

Examples of such processes involving use of lime include U.S. Pat. Nos. 5,013,458; 5,186,840; 5,405,536; 5,554,279 and 5,681,481.

In many uses, lime in the form of calcium oxide (CaO) is mixed with water (H2O) to form calcium hydroxide (CaOH2). The chemical reaction which occurs during such mixing, gives off heat in the form of an exothermic reaction, and when done with excess water is commonly referred to as "lime slaking", a process which is accomplished in a device known as a lime slaker. The resulting mixture of lime (CaOH2) and water is known as a lime slurry. Lime slurries are known to have some unique properties, one of which is its inherent ability to form scale on surfaces which come into contact with the lime slurry. The formation of scale, or "scaling" can render the various delivery systems, such as pipes, troughs, conduits, etc. unusable over time due to the build-up of scale. Alternatively, such scale build-up can require frequent cleaning and descaling of the equipment that is used to handle lime slurries. Cleaning and descaling operations can be considerably labor intensive.

Lime slurries also contain a certain amount of inert material that is commonly referred to as grit. Grit results because the calcium oxide, generally in the form of quicklime (CaO) contains a certain amount of material other than CaO. Typically, lime contains approximately 90%-95% CaO, and 5%-10% inert material, or grit.

The presence of grit in a lime slurry can cause numerous problems, including grit build-up in downstream process chambers or vessels, grit acting to plug or clog nozzles and orifices through which the slurry passes, and abrasions caused to treatment equipment and slurry delivery equipment such as pumps, pipes, valves, etc. because of the abrasive nature of grit particles.

Various techniques have been attempted for separation of unwanted grit that is contained within a lime slurry.

For example, U.S. Pat. No. 4,482,528 describes some of the problems that are encountered when trying to separate unwanted grit from a lime slurry. For example, using a gravity classifier to separate grit from a lime slurry when discharging from a lime slaker, is described as being unable to effectively remove particles smaller than 100 mesh (140 microns).

The gravity separation of grit, directly after the slaking of lime in a lime slaking device can be problematic, in that the amount and size of the grit removed will vary as the rate of discharge from the lime slaker varies. At high discharge rates from the slaker, the slurry will have less retention time in the grit separation chamber, which can be insufficient for the smaller grit particles to settle, such that the grit particles can be conveyed through the separation chamber and into the finished lime slurry, resulting in inconsistent and highly variable amounts of grit removal.

U.S. Pat. No. 4,482,528 attempts to improve upon gravity separation of grit by the use of a cyclone followed by at least one gravity classifier device. The cyclone operates centrifugally, and removes grit and lime, which discharges from the cyclone into a gravity classifier, wherein dilution water is added in order to allow the grit to settle in the classifier.

SUMMARY OF INVENTION

The present invention provides a method and apparatus for removing unwanted grit from a lime slurry while allowing some grit to remain, without requiring multiple steps of cyclone separation plus gravity separation, and without requiring the use of dilution water in the process and therefore without introducing variations in slurry concentration to the resultant final slurry output.

Accordingly, it is a primary object of this invention to provide a novel method and apparatus for removing grit particles from a watery lime slurry during the process of delivering slurry from a slurry tank, whereby the slurry is substantially continuously delivered from the slurry tank to a grit separator, with a portion of the slurry being extracted for discharge, while the rest of the slurry is recirculated to the slurry tank after separation of some of the grit from the slurry.

It is a further object of this invention to accomplish the above object, wherein the separation of grit occurs in a gravity-operative grit classifier.

It is another object of this invention to accomplish the above objects, wherein the slurry that is extracted is done on a controlled basis.

It is a further object of this invention to accomplish the above objects, wherein the recirculation of slurry involves the serial flow of slurry from the slurry tank to the grit separation point, followed by a recirculation of the remaining slurry to the slurry tank.

It is another object of this invention, wherein grit is separated from a watery lime slurry, by the substantially continuous delivery of slurry to a grit separation point, and wherein the rest of the slurry is recirculated to the slurry tank, and wherein a parallel flow of slurry from the slurry tank provides for substantially continuous delivering of slurry and its simultaneous recirculation.

Other objects and advantages of the present invention will be readily apparent upon a reading of the following brief descriptions of the drawing figures, the detailed descriptions of the preferred embodiments, and the appended claims.

DETAILED DESCRIPTIONS OF THE PREFERRED EMBODIMENTS

Figure 1:
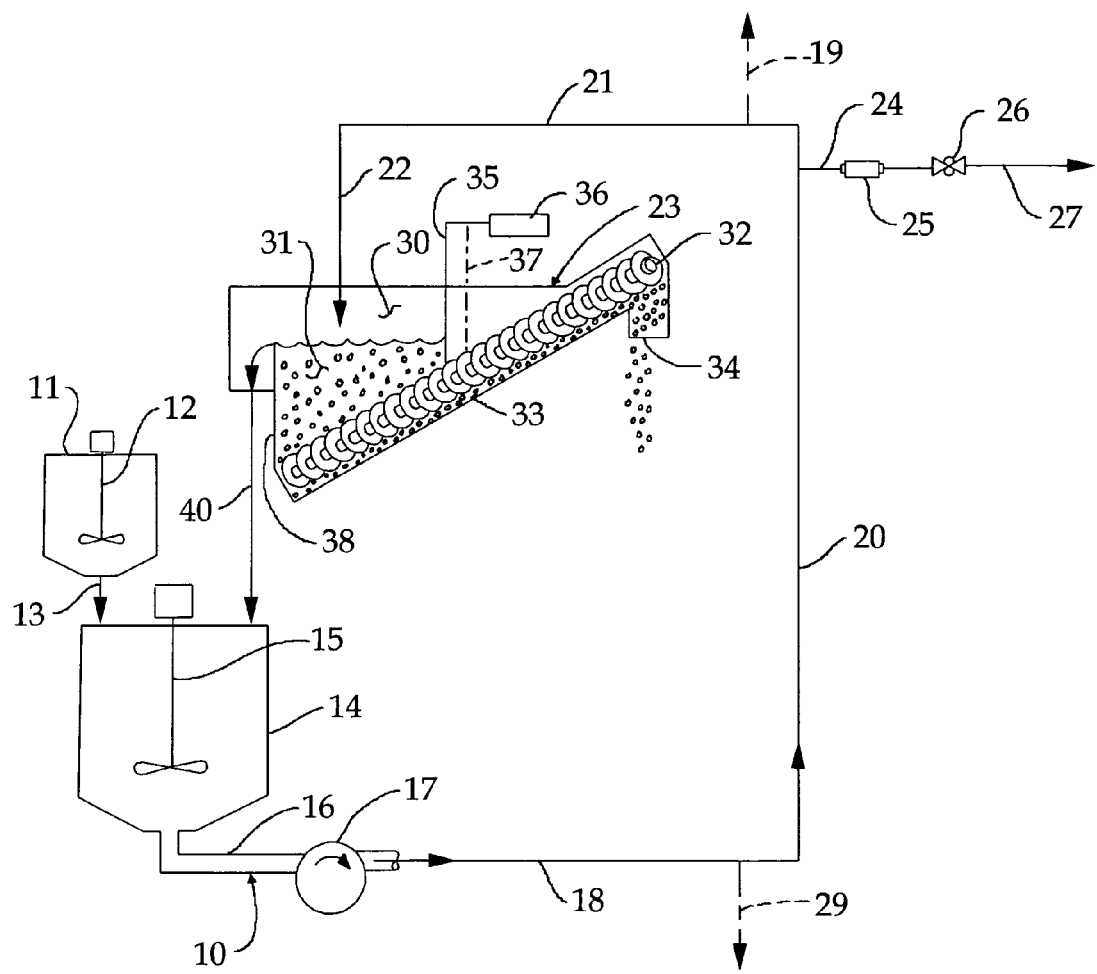
FIG. 1 is a flow diagram illustrating delivery of lime to a slurry tank from a lime slaker, followed by the delivery of slurry from a slurry tank to an extraction site for some of the slurry, while the rest of the slurry is delivered to a separation device for separating some of the grit from the slurry, with the slurry then being recirculated to the slurry tank, wherein the flow of slurry from the slurry tank to the point of grit separation, followed by the recirculation of slurry from the grit separation point to the slurry tank, is serial.

Referring now to the drawings in detail, reference is first made to FIG. 1, in which a serial slurry treatment system is generally designated by the numeral 10, as including a lime slaker 11, which may have a agitation device such as a mixer 12 therein, for delivering slaked lime via conduit 13, to a slurry tank 14. The lime slaker 11 may be of any desired type, such as the type disclosed in U.S. Pat. Nos. 2,904,401; 5,368,731; 4,261,953; 4,482,528, or of any other desired type.

The watery lime slurry is thus delivered from the slurry tank 14, which may have one or more mixers 15 therein, to be delivered via a delivery line, conduit, or pipe 16, by means of a pump, to a delivery line 18, then to a grit classifier 23 via delivery lines 20, 21 and 22, as shown in FIG. 1. During the delivery of lime slurry as described above, to the grit classifier 23, some of the lime slurry may be extracted via extraction line 24, in a controlled manner, with the control being provided via flowmeter 25 and control valve 26, to discharge via line 27, which may lead to the point of application of the lime slurry.

The grit removal or separation device 23 includes a tank 30, having a liquid level 31 therein, with a sloped auger, the lower end of which is immersed within the liquid level 31, and which operates to engage grit particles and convey them up the sloped surface 33, to a point of discharge 34, as shown.

The grit separation device 23 may be provided with a movable wall 35, controlled by a suitable electric or pneumatic actuator 36, for leftward and rightward movement, as shown, between the full line position 35 as shown, and a phantom line position 37, as shown, in order to vary the cross-sectional surface area, which will cause an automatic, continuous or intermittent variation in the volume of liquid 31 retained within the grit classifier 23.

The upper edge of grit classifier wall 38 provides a means for overflow of lime slurry from the grit classifier 23, via line 40, recirculating back into the slurry tank 14, as shown.

The pump 17 is selected in size, to provide a desired velocity through the conduit, pipe or delivery line 18, 20, 21, so that particles of lime and grit do not settle within such delivery line, pipe or conduit. The selected velocity of flow through the lines 18, 20, 21 also provides a scouring action from entrained grit which helps keep the same from clogging due to build-up of scale within the same.

It will thus be seen that the grit classifier 23, while acting via gravity removal of grit, allows a small quantity of grit to remain in the slurry to assist the scouring action of the slurry with some grit in it, for preventing build-up of lime scale within the system.

It will also be understood that the electric or pneumatic activator drive 36 for varying placement of the wall 35 can be operated continuously or automatically, as may be desired.

It will be seen, that in accordance with this invention, it is not necessary to add any dilution water to the lime slurry, such that the percentage of lime relative to water remains substantially constant.

It will also be apparent by the use of the flowmeter 25 and valve 26, the amount of lime being feed to discharge, such as the point of application, can be carefully controlled.

Figure 2:
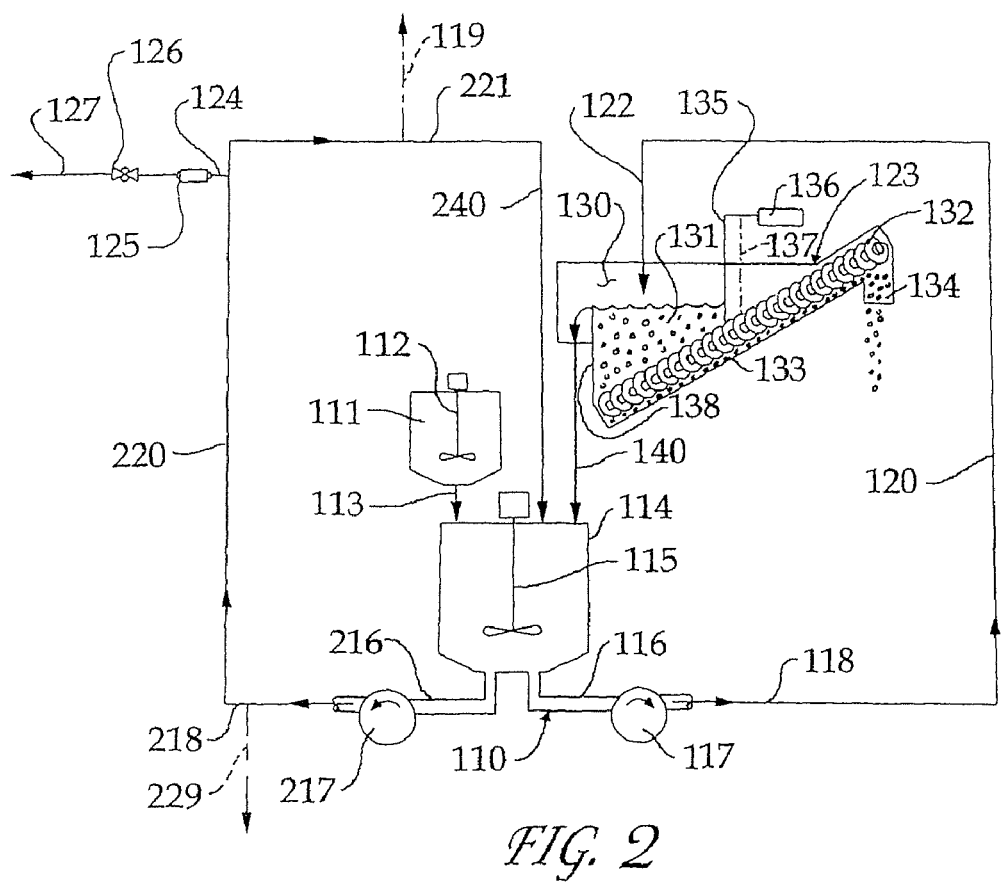
FIG. 2 is an illustration of a flow diagram, similar to that of FIG. 1, but wherein the withdrawal of slurry from the slurry tank to the point of grit separation and return to the slurry tank is in a parallel flow arrangement to the extraction of slurry from the system.

Referring to FIG. 2, the parallel loop system will now be described, with similar components to those illustrated in FIG. 1 operating in the same manner as such components are described above with respect to FIG. 1. The lime slaker 111 is may be provided with one or more agitation devices such as a mixer 112, for delivering slaked lime via conduit or delivery line 113 to the lime slurry tank 114. The lime slurry tank 114 is provided with one or more mixers 115 therein, suitably motor driven, as are those for the embodiment of FIG. 1, whereby some of the discharge from the slurry tank 114 is delivered via delivery line 116, being pumped in the direction shown via pump 117, to delivery lines, conduits, pipes or the like 118, 120 and 121, to delivery line 122, into the gravity separation classifier 123, to form a liquid level 131 therein in the volume 130 thereof, such that grit can separate via gravity therein, for discharge via auger 132 up slope 133, to grit discharge location 134, as shown.

The recirculation of the slurry from grit classifier tank 123, over end wall 138, back to the slurry tank 114, via conduit or delivery line 140, is similar to that described above with respect to FIG. 1. Similarly, the automatic, continuous or intermittent variation in volume of liquid level 131 in separation classifier 123, by movement of the wall 135 from the full line position shown, to the phantom line position 137 shown, via wall drive mechanism 136, is similar to that set forth above with respect to FIG. 1.

Parallel to the flow from slurry tank 114 via pump 117 and conduit 118, 120, 121 and 122, is the flow via delivery line 216 from the tank 114, as will now be described.

The pump 217 pumps the watery lime slurry from tank 114, via conduits or delivery lines 218, 220, 221 and 240, back into the tank 114. During the course of such recirculation, extraction can occur via line 124, controlled by flowmeter 125 and valve 126, to the point of application via line 127.

Figure 3:
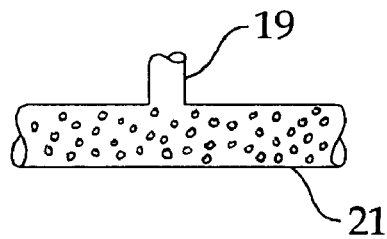
FIG. 3 is an enlarged detail view of the extraction of slurry from a delivery conduit, in a vertical upward direction.

With reference now to FIG. 3, it will be seen that the extraction of lime slurry from line 21 of FIG. 1 can be vertically upwardly, via extraction line 19, where it may be desired to minimize the extraction of grit particles. Such may be desirable for purposes as air pollution control, wherein upwardly from extraction line 19 (not shown), the lime slurry is sprayed through a nozzle into the air to be treated. In such situations, it can be desirable to avoid the tendency of grit particles to clog nozzles, and thus the extraction location 19 may be upwardly, as shown. Similarly, with respect to the embodiment of FIG. 2, the extraction can occur upwardly, via phantom extraction line 119. With respect to a vertical upward extraction, from the system shown in FIG. 2, such extraction can occur from line 221, via phantom line 119, similar to the extraction shown in FIG. 3 that is vertically upwardly, via line 19, from horizontal line 21.

Figure 4:
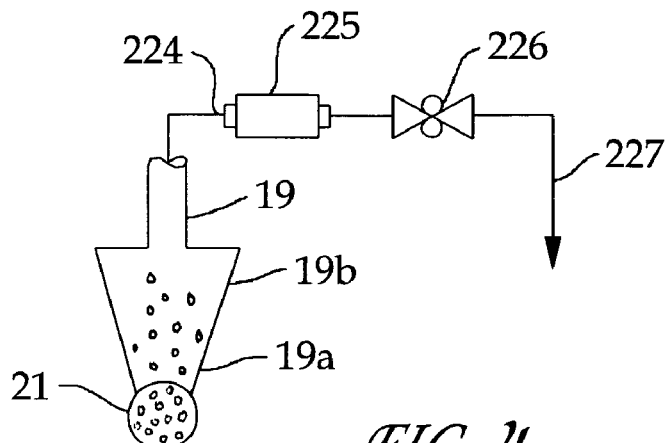
FIG. 4 is a detail view of the extraction of slurry from a slurry conduit, in a vertical upward direction, in which the cross-sectional size of the vertical upward conduit has at least a portion that is of greater cross-sectional size.

With respect to FIG. 4, from line 21, such extraction can likewise be vertically upwardly via line 19, but with line 19 having a predetermined cross-sectional diameter that varies from a lower end 19a thereof, to an upper end 19b thereof, with such cross-sectional size at the upper-most end further reducing the tendency for grit particles to travel upward via line 19, with the embodiment of FIG. 4 sufficing to slow the rate of rise of fluid therein, because of the upwardly increasing diameter, for the virtual illumination of any grit particles from passing upwardly via line 19. The extraction can then proceed via line 224, through flowmeter 225, through control valve 226 and via extraction line 227, to the point of application. It will be understood that the flowmeter 225 and valve 226 operate similarly to the operation of the flowmeter 25 and valve 26 illustrated in FIG. 1.

Figure 5:
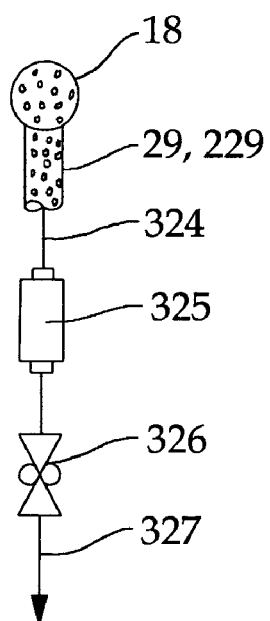
FIG. 5 is a detail view showing the extraction of slurry from the slurry discharge line via a vertical downward direction, for gravity extraction of grit along with the extraction of slurry.

With reference now to FIG. 5, it will be seen that the line 18 shown in FIG. 1, is illustrated in cross-section, as having a lime slurry, with grit therein, and that the discharge line shown in phantom at 29 in FIG. 1, is illustrated in FIG. 5, to illustrate an alternative withdrawal or extraction of lime slurry from the bottom of recirculation line 18, or alternatively via phantom extraction line 229 illustrated in FIG. 2, such that grit particles can be drawn off via extraction line 324 through flowmeter 325 and valve 326, via extraction discharge line 327, to the point of application. Such may be desirable where one may desire to scour scale build-up downstream of extraction lines 29, 229, as shown in FIG. 5.

It will also be apparent that the valves 26, 126, 226 and 326 can be controlled to be open partially, or fully; in the later case, should one desire to allow a flush of high velocity lime slurry to pass therethrough to the point of application, for providing a cleaning action.

It will be apparent from the foregoing that various modifications may be provided, in the details of construction of an apparatus in accordance with this invention, as well as in the use and operation thereof, all within the spirit and scope of the invention as defined in the appended claims. It will further be understood that where features of this invention are recited in the "means plus function" terminology, it is intended that they embrace all means capable of providing such function in addition to the representative embodiments described and illustrated, unless otherwise specifically limited herein.

What is claimed is:

1. A method of treating lime slurry in a slurry treatment system, comprising the steps of:
   (a) providing a watery lime slurry having lime particles and grit particles therein, in a slurry tank;
   (b) delivering slurry from the slurry tank via a delivery line and extracting a portion of the slurry delivered from the slurry tank via delivery line and discharging said extracted portion of the slurry from said delivery line;
   (c) substantially continuously delivering slurry from the slurry tank to a device for gravity separation of some of the grit from the rest of the slurry without adding dilution water in the process; and
   (d) recirculating the rest of the slurry to the slurry tank after separation of some of the grit from the slurry.

2. The method of claim 1, wherein the substantially continuously delivering step includes delivering the slurry to a gravity-operative grit classifier device where the separation of some of the grit from the rest of the slurry, via gravity grit separation, takes place.

3. The method of claim 2, wherein the classifier device is comprised of a predetermined operative volume, including the step of varying the amount of operative volume that is used during the separation step, to control the amount of separation of grit from the rest of the slurry.

4. The method of claim 2, wherein said discharging step includes controlling the discharge of the extracted portion of the slurry from the delivery line, wherein some grit is retained in the slurry while some of the grit is removed from the rest of the slurry, for scouring built-up scale from the treatment system, and including the step of mixing the slurry in the slurry tank.

5. The method of claim 4, wherein the classifier device is comprised of a predetermined operative volume, including the step of varying the amount of operative volume that is used during the separation step, to control the amount of separation of grit from the rest of the slurry.

6. The method of claim 1, wherein said discharging step includes controlling the discharge of the extracted portion of the slurry from the delivery line.

7. The method of claim 6, wherein the controlling step includes metered valve-actuated control.

8. The method of claim 1, wherein said substantially continuous delivering and said recirculating steps include a serial flow of slurry from the slurry tank to the device for separation followed by the recirculating step.

9. The method of claim 1, wherein said substantially continuous delivering and said recirculating steps include a flow of slurry from the slurry tank to the device for separation, simultaneous with the recirculating step, with the recirculating being done substantially continuously.

10. The method of claim 1, wherein lime slurry is delivered to the slurry tank via a lime slaking device.

11. The method of claim 1, wherein some grit is retained in the slurry while some of the grit is removed from the rest of the slurry, for scouring scale from the treatment system.

12. The method of claim 1, wherein the extracting step includes extracting slurry from the delivery line from a vertical upward direction, to minimize extraction of grit with the extraction of slurry.

13. The method of claim 12, wherein the extracting step includes a predetermined selection of the size of an extraction line connected to the delivery line, to have a larger cross-sectional portion to provide a reduced rise rate of the slurry.

14. The method of claim 1, wherein the extracting step includes extracting slurry from the delivery line via a vertical downward direction, for gravity extraction of grit with the extraction of slurry.

15. The method of claim 1, including the step of mixing the slurry in the slurry tank.

* * * * *